(12) United States Patent
Todhunter et al.

(10) Patent No.: US 8,799,776 B2
(45) Date of Patent: Aug. 5, 2014

(54) SEMANTIC PROCESSOR FOR RECOGNITION OF WHOLE-PART RELATIONS IN NATURAL LANGUAGE DOCUMENTS

(75) Inventors: James Todhunter, Framingham, MA (US); Igor Sovpel, Minsk (BY); Dzianis Pastanohau, Minsk (BY); Alexander Vorontsov, Minsk (BY); Alexei Vertel, Minsk (BY)

(73) Assignee: Invention Machine Corporation, Boston, MA (US)

( * ) Notice: Subject to any disclaimer, the term of this patent is extended or adjusted under 35 U.S.C. 154(b) by 1017 days.

(21) Appl. No.: 11/686,660

(22) Filed: Mar. 15, 2007

(65) Prior Publication Data

US 2007/0156393 A1  Jul. 5, 2007

Related U.S. Application Data

(63) Continuation-in-part of application No. 10/208,941, filed on Jul. 31, 2002, now Pat. No. 7,251,781.

(60) Provisional application No. 60/308,886, filed on Jul. 31, 2001.

(51) Int. Cl.
*G06F 17/00* (2006.01)
*G06F 17/27* (2006.01)
*G06F 17/21* (2006.01)

(52) U.S. Cl.
CPC ............ *G06F 17/2785* (2013.01); *G06F 17/27* (2013.01); *G06F 17/21* (2013.01)
USPC ........................................................ 715/256

(58) Field of Classification Search
CPC ....... G06F 17/21; G06F 17/27; G06F 17/2785
USPC ............................................................ 715/256
See application file for complete search history.

(56) References Cited

U.S. PATENT DOCUMENTS 5,331,556 A * 7/1994 Black et al. ...................... 704/9
5,418,889 A  5/1995 Ito (Continued)

FOREIGN PATENT DOCUMENTS

EP   1793318   6/2007
WO  2005083597  9/2005

(Continued)

OTHER PUBLICATIONS

Engelson, et al., "A Memory-Based Approach to Learning Shallow Natural Language Patterns", Bar-Ilan University, Israel, May 23, 1999, p. 1-28.*

(Continued)

*Primary Examiner* — Amelia Tapp
(74) *Attorney, Agent, or Firm* — Faegre Baker Daniels LLP

(57) ABSTRACT

A semantic processor and method for automatically recognizing Whole-Part relations in at least one natural language electronic or digital document recognizes one or more expanded Subject-Action-Object (eSAO) sets in text, wherein each eSAO set has one or more eSAO components; matches the one or more eSAO sets against Whole-Part relationship patterns, and generates one or more eSAO Whole-Part relations based on the matching, wherein the eSAO Whole-Part relation comprises a Whole eSAO and an Part eSAO.

24 Claims, 4 Drawing Sheets

(56) References Cited

U.S. PATENT DOCUMENTS

| | | | |
|---|---|---|---|
| 5,638,543 A | 6/1997 | Pedersen et al. | |
| 5,696,916 A | 12/1997 | Yamazaki et al. | |
| 5,708,825 A | 1/1998 | Sotomayor | |
| 5,715,468 A * | 2/1998 | Budzinski | 704/9 |
| 5,748,973 A | 5/1998 | Palmer et al. | |
| 5,774,845 A | 6/1998 | Ando et al. | |
| 5,924,108 A | 7/1999 | Fein et al. | |
| 5,963,940 A | 10/1999 | Liddy et al. | |
| 5,978,820 A | 11/1999 | Mase et al. | |
| 6,026,388 A | 2/2000 | Liddy et al. | |
| 6,076,088 A * | 6/2000 | Paik et al. | 1/1 |
| 6,094,652 A | 7/2000 | Faisal | |
| 6,128,634 A | 10/2000 | Golovchinsky et al. | |
| 6,167,370 A | 12/2000 | Tsourikov et al. | |
| 6,171,109 B1 | 1/2001 | Ohsuga | |
| 6,185,592 B1 | 2/2001 | Boguraev et al. | |
| 6,205,456 B1 | 3/2001 | Nakao | |
| 6,212,494 B1 | 4/2001 | Boguraev | |
| 6,246,977 B1 | 6/2001 | Messerly et al. | |
| 6,263,335 B1 | 7/2001 | Paik et al. | |
| 6,317,708 B1 | 11/2001 | Witbrock et al. | |
| 6,338,034 B1 | 1/2002 | Ishikawa et al. | |
| 6,349,316 B2 | 2/2002 | Fein et al. | |
| 6,363,378 B1 | 3/2002 | Conklin et al. | |
| 6,374,209 B1 | 4/2002 | Yoshimi et al. | |
| 6,401,086 B1 | 6/2002 | Bruckner | |
| 6,424,362 B1 | 7/2002 | Bornstein et al. | |
| 6,442,566 B1 | 8/2002 | Atman et al. | |
| 6,537,325 B1 | 3/2003 | Nishizawa | |
| 6,557,011 B1 | 4/2003 | Sevitsky et al. | |
| 6,701,345 B1 | 3/2004 | Carley et al. | |
| 6,754,654 B1 | 6/2004 | Shah et al. | |
| 6,789,230 B2 | 9/2004 | Katariya et al. | |
| 6,823,325 B1 | 11/2004 | Davies et al. | |
| 6,823,331 B1 | 11/2004 | Abu-Hakima | |
| 6,829,603 B1 | 12/2004 | Chai et al. | |
| 6,871,199 B1 | 3/2005 | Binnig et al. | |
| 7,035,877 B2 | 4/2006 | Markham et al. | |
| 7,120,574 B2 | 10/2006 | Troyanova et al. | |
| 7,251,781 B2 | 7/2007 | Batchilo et al. | |
| 2001/0049688 A1 | 12/2001 | Fratkina et al. | |
| 2002/0010574 A1 | 1/2002 | Tsourikov et al. | |
| 2002/0010909 A1 | 1/2002 | Charisius et al. | |
| 2002/0103793 A1 | 8/2002 | Koller et al. | |
| 2002/0111784 A1 | 8/2002 | Keller et al. | |
| 2002/0169598 A1 | 11/2002 | Minker | |
| 2003/0130837 A1 | 7/2003 | Batchilo et al. | |
| 2004/0001099 A1 | 1/2004 | Reynar et al. | |
| 2004/0019588 A1 | 1/2004 | Doganata et al. | |
| 2004/0268283 A1 | 12/2004 | Perry et al. | |
| 2005/0015217 A1 | 1/2005 | Weidl et al. | |
| 2005/0055385 A1 | 3/2005 | Sinha et al. | |
| 2005/0114282 A1 | 5/2005 | Todhunter | |
| 2006/0041424 A1 | 2/2006 | Todhunter et al. | |
| 2006/0142907 A1 | 6/2006 | Cancilla et al. | |
| 2006/0167931 A1 | 7/2006 | Bobick et al. | |
| 2006/0242195 A1 | 10/2006 | Bove et al. | |
| 2007/0006177 A1 | 1/2007 | Aiber et al. | |
| 2007/0050393 A1 | 3/2007 | Vogel et al. | |
| 2007/0073651 A1 | 3/2007 | Imielinski | |
| 2008/0294637 A1 | 11/2008 | Liu | |
| 2008/0319735 A1 | 12/2008 | Kambhatla et al. | |
| 2010/0235164 A1 | 9/2010 | Todhunter et al. | |
| 2010/0235165 A1 | 9/2010 | Todhunter et al. | |
| 2010/0235340 A1 | 9/2010 | Todhunter et al. | |

FOREIGN PATENT DOCUMENTS

| | | |
|---|---|---|
| WO | 2007051106 | 5/2007 |
| WO | 2008113065 | 9/2008 |
| WO | 2009016631 | 2/2009 |

OTHER PUBLICATIONS

Storey, "Understanding Semantic Relationships", VLDB Journal, 2, p. 455-488 (1993).*

International Search Report dated Jul. 30, 2008 issued in corresponding International Application No. PCT/US2008/057183.

Davidov, et al., "Classification of Sematic Relationships between Nominals Using Pattern Clusters." In:Porc. of ACL-08:HTL. Columbus, Ohio, USA, p. 227-235. Jun. 30, 2008.

Girju, et al, Roxana, "Automatic Discovery of Part-Whole Relations," Association for Computational Linguistics, Mar. 2006, vol. 32, No. 1, pp. 83-135, MIT Press Cambridge, MA, USA.

Extended European Search Report dated Apr. 1, 2011, issued in corresponding European Application No. 08732326, 7 pages.

Extended European Search Report dated Jul. 18, 2012, issued in corresponding European Application No. 10751508.

Extended European Search Report dated Jul. 20, 2012, issued in corresponding European Application No. 10751510.

* cited by examiner

SEMANTIC PROCESSOR FOR RECOGNITION OF WHOLE-PART RELATIONS IN NATURAL LANGUAGE DOCUMENTS

CROSS REFERENCES TO RELATED APPLICATIONS

The present application is a continuation-in-part application of co-pending U.S. patent application Ser. No. 10/208,941, filed Jul. 31, 2002, entitled "Computer Based Summarization of Natural Language Documents" (published as U.S. Patent App. Pub. No. 20030130837 on Jul. 10, 2003, which claims priority to U.S. Provisional Application Ser. No. 60/308,886, titled "Computer Based Summarization of Natural Language Documents," filed Jul. 31, 2001). These applications are incorporated herein by reference in their entirety.

The present application, while not claiming priority to, may also be related to the following U.S. Pat. No. 6,167,370 "Document Semantic Analysis/Selection with Knowledge Creativity Capability utilizing Subject-Action-Object (SAO) structures," issued Dec. 26, 2000 to Tsourikov et al., which is incorporated herein by reference in its entirety.

FIELD OF INTEREST

This application relates to systems and methods for automatic knowledge recognition and extraction from documents in electronic or digital form, which reflect Whole-Part semantic relations between objects/concepts and facts of the outside world/subject domain.

BACKGROUND

The following U.S. Patent documents provide descriptions of art related to the present application: U.S. Pat. No. 5,418,889, issued May 1995 to Ito (hereinafter Ito); U.S. Pat. No. 5,696,916, issued December 1997 to Hitachi (hereinafter Hitachi); U.S. Pat. No. 6,026,388 issued February 2000 to Liddy et al. (hereinafter Liddy); U.S. Pat. No. 6,185,592, issued February 2001 to Boguraev et al. (hereinafter Boguraev 1); U.S. Pat. No. 6,212,494, issued April 2001 to Boguraev (hereinafter Bogureav 2); U.S. Pat. No. 6,263,335, issued July 2001 to Paik et al. (hereinafter Paik); U.S. Pat. No. 6,754,654, issued June 2004 to Kim et al. (hereinafter Kim); U.S. Pat. No. 6,823,325, issued November 2004 to Davies et al. (hereinafter Davies); and U.S. Pat. No. 6,871,199, issued March 2005 to Binniget et al. (hereinafter Binniget).

Knowledge bases and knowledge engineering are the key components of modern information systems and correspondingly technologies. Knowledge engineering was traditionally based on generalization of information obtained from experts in different knowledge domains. However, analysis shows that this approach cannot be utilized for creating adequate real-life (industrial) applications. Two questions arise: first, what can be the most reliable and effective source of such knowledge; and second, how can this knowledge be recognized, extracted and later formalized. Analysis shows, that at the present time, the time of global computerization, the most reliable source of knowledge is text in the broad sense of the word, that is, text as a set of documents in natural language (books, articles, patents, reports etc.). Thus, the basic premises of knowledge engineering in the light of the second question are as follows:

1 text is the ideal natural and intellectual model of knowledge representation
2. one can find everything in the text The second premise may seem excessively categorical, but with the tendency to increase the text range, this is more and more the case.

What types of knowledge can be obtained from text and with what automatic means? Some existing methods are aimed at databases having a strict structure and manually compiled or at texts with strictly defined fields. A shallow linguistic analysis of text is usually performed. Kim describes processing text with a rigid structure (primarily emails). Kim's process extracts corresponding information from previously known fields of source documents and places it in predefined fields of a database (DB) that reflects the structure of the organization (such a DB has, for example, fields for names and titles of individuals within an organization). The linguistic processing described in Kim is utilized only for the extraction of key terms from documents according to the so-called filters.

Davies describes the performance of lexical and grammatical analysis of text in order to differentiate nouns from verbs and to perform, in such a way, a strongly definite search in a predefined and structured database according to "how," "why," "what," and "what is" relations.

Binniget also describes the use of a pre-structured database (i.e., a Knowledge Database) in the form of a fractal hierarchical network, which reflects the knowledge of the outside world (knowledge domain) in order to automatically expand information from an input string. Initially the input string (for example, part of sentence, or the whole sentence, etc.) is treated with a semantic processor that performs syntactic and grammatical parsing and transforming to build an input network. This network is then "immersed" into the Knowledge Database to expand the input information that is some kind of recording and later expansion of input information by means of a model of the outside world concerning objects, their relations and attributes.

Boguraev 1 describes the performance of a deep text analysis where, for text segments, the most significant noun groups are marked on the basis of their usage frequency in weighted semantic roles.

All abovementioned cases are concern with a particular knowledge about concepts. This is an entry level of knowledge that can be extracted from text.

Boguraev 2 describes the use of computer-mediated linguistic analysis to create a catalog of key terms in technical fields and to also determine doers (solvers) of technical functions (verb-object).

Hitachi describes a system that uses a predefined concept dictionary with high-low relations, namely, is-a relations and part-whole relations between concepts.

Liddy uses a similar technology for user query expansion in an information search system.

Ito describes the use of a Knowledge Base, including a Causal Model Base and a Device Model Base. The Device Model Base has sets of device knowledge describing the hierarchy of devices of the target machine. The Casual Model Base is formed on the basis of the Device Model Base and has sets of casual relations of fault events in the target machine. Thus, the possible cause of failure in each element of the device is guessed on the basis of information about its structural connections with other elements of the device. Usually, these are the most "connected" elements, which are determined as the cause.

Paik describes a system that is domain-independent and automatically builds its own subject knowledge base. The system recognizes concepts (any named entity or idea, such as a person, place, thing or organization) and relations between them. These relations allow the creation of conceptrelation-concept triples. Thus, the knowledge recognized in Paik is close to the next important knowledge level-facts (subject-action-object), although they are not yet facts suitable for recognition of such important semantic relations as Whole-Part relations.

In fact, none of the above approaches teach or suggest processing text in electronic documents or digital information to determine Whole-Part semantic relations between objects/concepts and facts of the outside world/subject domain.

SUMMARY OF INVENTION

In accordance with aspects of the present invention, provided a method for automatically recognizing Whole-Part relations in natural language documents. The method comprises: providing text from at least one natural language document; recognizing one or more expanded Subject-Action-Object (eSAO) sets in the text, wherein each eSAO set has one or more eSAO components; matching the one or more eSAO sets against Whole-Part relationship patterns; and generating one or more eSAO Whole-Part relations based on the matching, wherein the eSAO Whole-Part relation comprises a Whole eSAO and an Part eSAO.

The one or more eSAO components can be one or more elements from a group comprising: subjects, objects, actions, adjectives, prepositions, indirect objects, and adverbs.

The Whole eSAO can comprise one or more of the eSAO components or a part of a single eSAO component of the one or more eSAO sets and the Part eSAO can comprise one or more of the eSAO components or a part of a single eSAO component of the one or more eSAO sets.

The eSAO Whole-Part relations can comprise a sequential operator relating the eSAO components of the Whole eSAO to the eSAO components of the Part eSAO, the operator including one or more of a lexical, grammatical, and semantic language indicator.

The method can further comprise: applying parts-of-speech tags to at least portions of the text to generate tagged portions of the text; and parsing the tagged portions of the text to generate parsed and tagged portions of the text, wherein recognizing the eSAO sets in the text is performed on the parsed and tagged portions of the text.

Applying parts-of-speech tags can be performed on preformatted portions of the text, whereby the preformatted portions of the text comprise the text with non-natural language symbols removed.

Matching the one or more eSAO sets against Whole-Part relationship patterns can comprise matching a single eSAO set and generating one or more eSAO Whole-Part relations based on the matching can comprise generating a single eSAO Whole-Part relation.

Matching the one or more eSAO sets against Whole-Part relationship patterns can comprise matching a pair of eSAO sets and generating one or more eSAO Whole-Part relations based on the matching can comprise generating a single eSAO Whole-Part relation based on matching the pair of eSAO sets.

Matching the one or more eSAO sets against Whole-Part relationship patterns can comprise accessing a Whole-Part pattern database that is generated by a method comprising: recognizing eSAO sets in a corpus of text documents; generating a corpus of sentences, wherein each sentence contains at least one of the recognized eSAO sets; recognizing particular cases of Whole-Part relations in the sentences; generalizing the particular cases of Whole-Part relations into eSAO Whole-Part patterns; and storing the eSAO Whole-Part patterns in the Whole-Part pattern database.

Recognizing one or more expanded Subject-Action-Object (eSAO) sets in the text can comprise accessing a linguistic knowledge base having a database defining eSAO component definitions in the form of Recognizing Linguistic Models.

Recognizing one or more expanded Subject-Action-Object (eSAO) sets in the text can comprise recognizing one or more of subjects, objects, actions, adjectives, prepositions, indirect objects, and adverbs in one or more sentences of the text.

In accordance with another aspect of the invention, provided is a method for generating a Whole-Part knowledge base by automatically recognizing Whole-Part relations in natural language documents. The method comprises: providing text from at least one natural language document; recognizing one or more expanded Subject-Action-Object (eSAO) sets in the text, wherein each eSAO set has one or more eSAO components; matching the one or more eSAO sets against Whole-Part relationship patterns; generating one or more eSAO Whole-Part relations based on the matching, wherein the eSAO Whole-Part relation comprises a Whole eSAO and an Part eSAO; and storing the one or more eSAO Whole-Part relations in the Whole-Part knowledge base.

In accordance with another aspect of the invention, provided is a computer program product comprising a computer-readable medium having computer-executable instructions for performing a method for recognizing Whole-Part relations in natural language documents. The method comprises: providing text from at least one natural language document; recognizing one or more expanded Subject-Action-Object (eSAO) sets in the text, wherein each eSAO set has one or more eSAO components; matching the one or more eSAO sets against Whole-Part relationship patterns; and generating one or more eSAO Whole-Part relations based on the matching, wherein the eSAO Whole-Part relation comprises a Whole eSAO and an Part eSAO.

The method can further comprise storing the one or more eSAO Whole-Part relations in a Whole-Part knowledge base.

In accordance with another aspect of the invention, provided is a semantic processor for automatically recognizing Whole-Part relations in text in electronic or digital form, the semantic processor comprising a linguistic knowledge base and a semantic analyzer. The semantic analyzer comprises an expanded subject-action-object (eSAO) recognizer for producing one or more eSAO sets based on the text, wherein the eSAO sets are based on eSAO definitions stored in the linguistic knowledge base in the form of Recognizing Linguistic Models, and a Whole-Part recognizer configured to match the one or more eSAO sets with known Whole-Part relationship patterns stored in the linguistic knowledge base and to produce one or more eSAO Whole-Part relations based on the match.

The semantic processor can comprise a linguistic analyzer that comprises the semantic analyzer. The linguistic analyzer can further comprise a part-of-speech tagger configured to apply parts of speech tags to at least portions of the text, and a parser configured to parse the text tagged by the parts-of-speech tagger and to provide the parsed and tagged text to the expanded subject-action-object (eSAO) recognizer.

The semantic processor can further comprise: a preformatter configured to receive the text in electronic or digital format and to produce preformatted text based on data stored in the linguistic knowledge base, for input to the part-of-speech tagger, and a knowledge base generator configured to produce a Whole-Part knowledge base from the one or more eSAO Whole-Part relations generated by the linguistic analyzer.

The preformatter can be configured to perform at least one of the following functions: remove symbols in a digital or electronic representation of the text that do not form a part of natural language text; detect and correct mismatches or mistakes in the text; and partition the text into structures of sentences and words.

The semantic processor can further comprise a Whole-Part relationship generator configured to generate and store the known Whole-Part relationship patterns. The Whole-Part relationship generator can comprise: a corpus linguistic analyzer configured to recognize eSAO sets in a corpus of text documents; a corpus eSAO generator configured to generate a corpus of sentences, wherein each sentence contains at least one of the recognized eSAO sets; a relation recognizer configured to recognize particular cases of Whole-Part relations in the sentences; a pattern generator configured to generalize the particular cases of Whole-Part relations to eSAO Whole-Part patterns; and a pattern tester configured to store the eSAO Whole-Part patterns in a Whole-Part pattern database.

The one or more eSAO Whole-Part relations can each comprise a Whole eSAO, a Part eSAO, and at least one sequential operator relating the Whole eSAO to the Part eSAO.

Each eSAO set based on the text can comprise eSAO components and the Whole eSAO can comprise one or more of the eSAO components and the Part eSAO can comprise one or more of the eSAO components different than the one or more eSAO components of the Whole eSAO.

The eSAO components can comprise one or more elements from a group comprising: subjects, objects, actions, adjectives, prepositions, indirect objects, and adverbs.

The Whole-Part recognizer can be further configured to match a single eSAO set with a known Whole-Part relationship pattern to generate a single eSAO Whole-Part relation.

The Whole-Part recognizer can be further configured to match a pair of eSAO sets with a known Whole-Part relationship pattern to generate a single eSAO Whole-Part relation.

BRIEF DESCRIPTION OF THE DRAWINGS

The drawing figures depict preferred embodiments by way of example, not by way of limitation. In the figures, like reference numerals refer to the same or similar elements.

DETAILED DESCRIPTION OF PREFERRED EMBODIMENT

Figure 1:
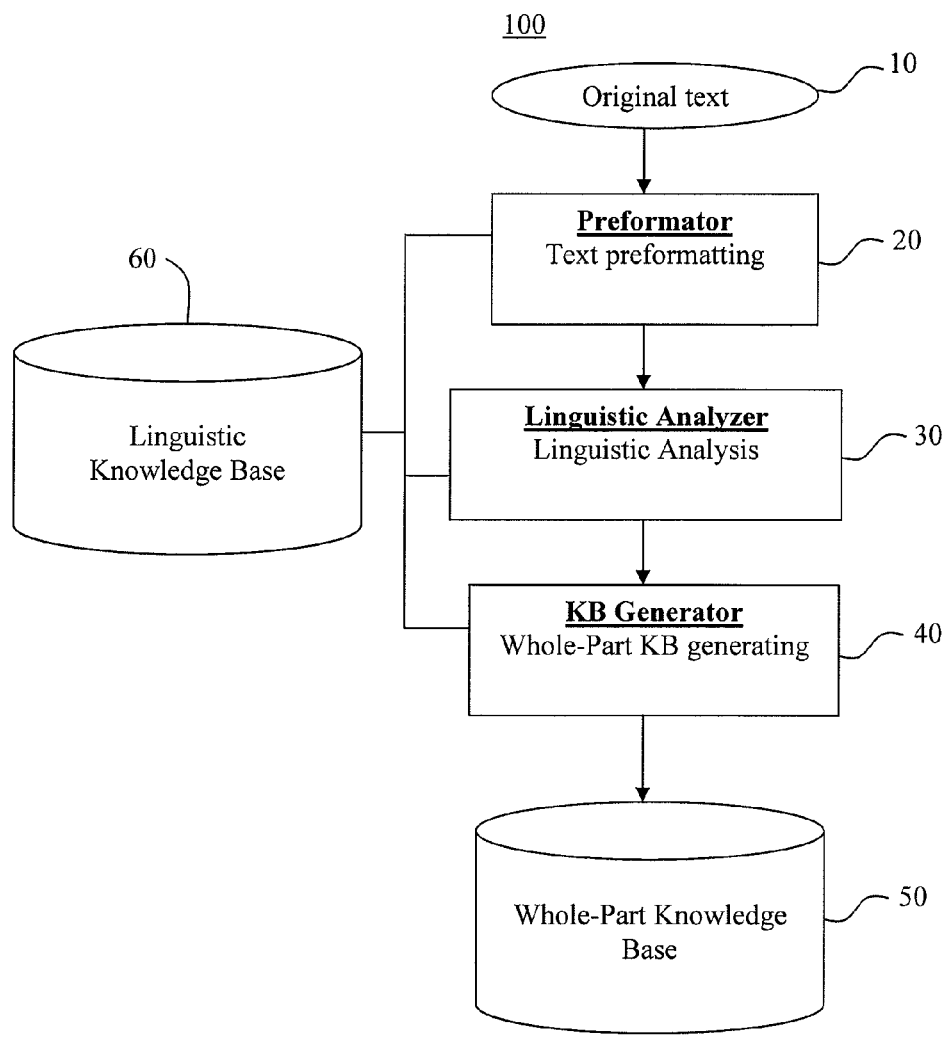
FIG. 1 is an embodiment of a structural and functional scheme of the Semantic Processor according to aspects of the present invention.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In the various embodiments, provided is a system and method for automatic recognition and extraction from documents in electronic or digital form of very important knowledge reflecting "Whole-Part" semantic relations between objects/concepts and facts. For example, Whole-Part semantic relations between objects/concepts show what components a certain technical device includes. And whole-part semantic relations between facts, for example, show operations a certain technological process includes and an order of the operations.

In accordance with aspects of the present disclosure, unlike prior approaches that detected semantic relations between SAOs only, expanded SAOs (eSAOs) are used. In a preferred embodiment, eSAOs include seven components, where, again, at least one eSAO component is defined. The additional components provide a greater depth and quality of analysis. In other embodiments, the eSAOs could be expanded to include additional components. In this document, the terms "eSAO" and "eSAO set" are used interchangeably, where both terms refer to a collection of eSAO components.

In a preferred embodiment, the eSAO components comprise:
1. Subject (S), performs an action (A) on an object (O);
2. Action (A), performed by a subject (S) on an object (O);
3. Object (O), acted upon by a subject (S) with an action (A);
4. Adjective (Adj), characterizes subject (S) or action (A) which follows the subject in the eSAO with empty object (O) (e.g. "The invention is efficient." or "The water becomes hot.");
5. Preposition (Prep), governs an indirect object (IO) (e.g. "The lamp is placed on the table." or "The device reduces friction by ultrasound.");
6. Indirect Object (IO), manifested, as a rule, by a noun phrase, which together with a preposition characterizes an action (A), being an adverbial modifier (e.g. "The lamp is placed on the table." or "The device reduces friction by ultrasound."); and
7. Adverbial (Adv), characterizes, as a rule, the conditions of the performing action (A) (e.g. "The process is slowly modified." or "The driver must not turn wheel in such a manner.")

Examples of the application of the eSAO format are shown in Table 1 and Table 2 below:

TABLE 1

Input Sentence:

A dephasing element guide completely suppresses unwanted modes.

Output:

| | |
|---|---|
| Subject | dephasing element guide |
| Action | suppress |
| Object | unwanted mode |
| Preposition | — |
| Indirect Object | — |
| Adjective | — |
| Adverbial | completely |

TABLE 2

Input Sentence:

The maximum value of x is dependent on the ionic radius of the lanthanide element.

Output:

| | |
|---|---|
| Subject | maximum value of x |
| Action | be |
| Object | — |
| Preposition | on |
| Indirect Object | ionic radius of the lanthanide element |
| Adjective | dependent |
| Adverbial | — |

One of the types of semantic relations between facts, i.e. between eSAO, is Cause-Effect relations, as discussed in U.S. Patent Appl. Pub. No. 20030130837, titled "Computer Based Summarization of Natural Language Documents." Recognition of Cause-Effect relations is also described in that publication. For example, the input sentence "Today the user can download 10,000 papers from the web by typing the word 'screen.'" will result in the Cause-Effect relation between eSAOs shown in Table 3.

TABLE 3

| Cause: | |
|---|---|
| CauseSubject | user |
| CauseAction | type |
| CauseObject | word "screen" |
| CausePreposition | — |
| CauseIndirectObject | — |
| CauseAdjective | — |
| CauseAdverbial | — |
| Effect: | |
| EffectSubject | user |
| EffectAction | download |
| EffectObject | 10,000 papers |
| EffectPreposition | from |
| EffectIndirectObject | web |
| EffectAdjective | — |
| EffectAdverbial | — |

Semantic processing is used to establish the Whole-Part relations present in the knowledge from the eSAOs within natural language documents. Given that objects are constituent parts of facts (complete or incomplete), the eSAO format is considered here as the format for formal knowledge representation of document content.

In the illustrative embodiments, the semantic processing for recognizing Whole-Part relations in text in electronic or digital form comprises: preformatting the text; performing linguistic analysis; and generating a Whole-Part Knowledge Base.

An embodiment of a Whole-Part Semantic Processor, hereinafter Semantic Processor (SP), in accordance with aspects of the present invention may be appreciated with reference to FIG. 1. The Semantic Processor 100 processes an original text 10 to generate a Whole-Part Knowledge Base 50. In this embodiment, the Semantic Processor 100 includes a Preformatter 20 (for preformatting the original text), a Linguistic Analyzer 30 (for performing linguistic analysis), and a Knowledge Base Generator 40 (for generating the Whole-Part Knowledge Base 50). The functionality of all the modules of the Semantic Processor 100 may be maintained within a Linguistic Knowledge Base 60, which includes various databases, such as dictionaries, classifiers, statistical data, etc., and a database for recognizing linguistic models (for text-to-words splitting, recognition of noun and verb phrases, subject, object, action and their attributes, cause-effect recognition, etc.). The Linguistic Analyzer 30 and the Knowledge Base Generator 40 are described in additional detail below. The text preformatting performed by the Preformatter 20 is preferably performed according to the techniques described in U.S. Patent Appl. Pub. No. 20030130837. Preferably, preformatting the text includes removing non-natural language symbols, e.g., punctuation, from the text.

Figure 2:
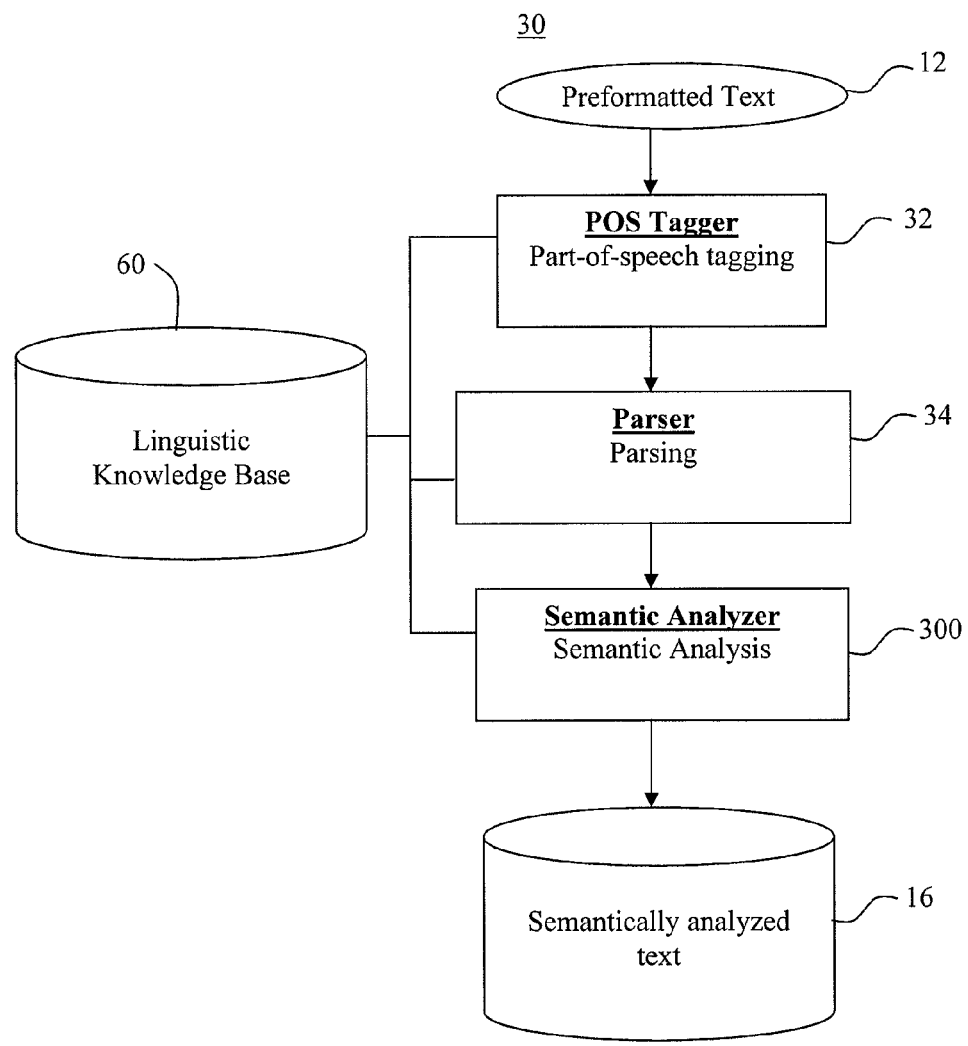
FIG. 2 is an embodiment of a structural and functional scheme of the Linguistic Analyzer according to aspects of the present invention.

FIG. 2 illustrates an embodiment of modules comprising the Linguistic Analyzer 30. The Linguistic Analyzer 30 processes preformatted text from the Preformatter 20 to produce semantically analyzed text 16. The preformatted text 12 is received by a Parts-of-Speech Tagger 32 (which determines and applies parts-of-speech tags to the preformatted text 12). The Parser 34 then parses the POS tagged text for processing by the Semantic Analyzer 300. The functions performed by the POS Tagger and the Parser 34 are preferably performed in accordance with the techniques described in U.S. Patent App. Pub. No. 20030130837.

Figure 3:
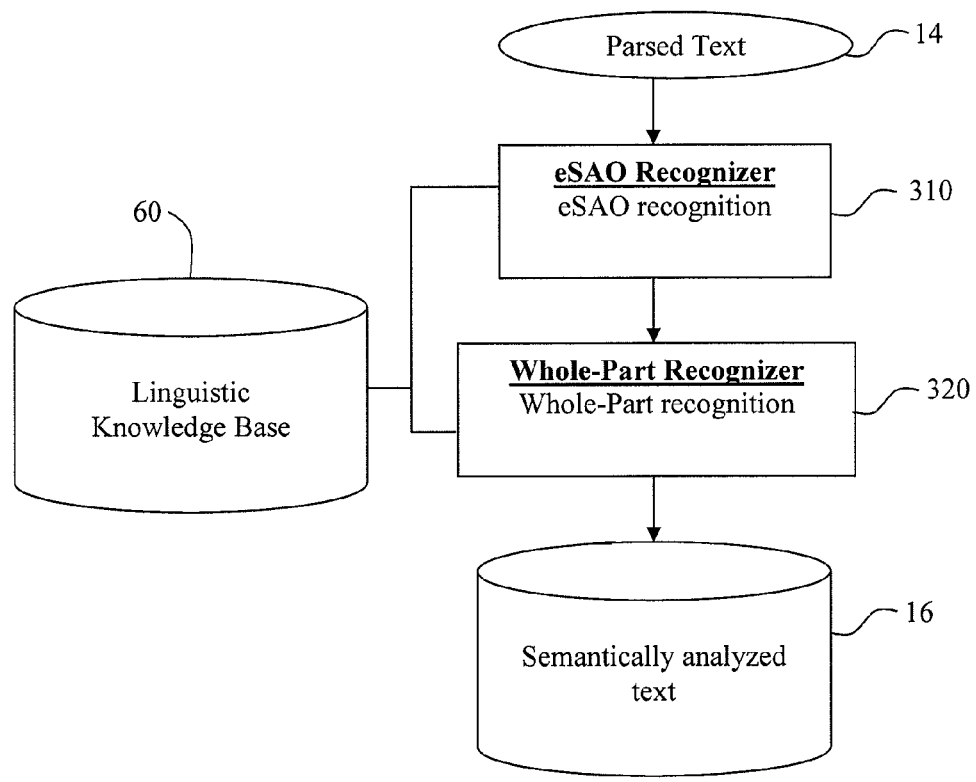
FIG. 3 is an embodiment of a structural and functional scheme of the Semantic Analyzer according to aspects of the present invention.

FIG. 3 illustrates an embodiment of modules comprising the Semantic Analyzer 300. The Semantic Analyzer 300 receives parsed text 14 and produces the semantically analyzed text 16. The Semantic Analyzer 300 has an eSAO Recognizer 310 that performs eSAO recognition. ESAO recognition is preferably performed in accordance with the techniques described in U.S. Patent Appl. Pub. 20020010574 and U.S. Patent Appl. Pub. No. 20020116176. The recognition of all eSAO elements is implemented by means of corresponding Recognizing Linguistic Models that are part of the Knowledge Base 100. These models describe rules that use part-of-speech tags, lexemes and syntactic categories which are then used to extract from the parsed text eSAOs with finite actions, non-finite actions, verbal nouns. One example of an Action extraction rule is:

<HVZ><BEN><VBN>=>(<A>=<VBN>)

This rule means that "if an input sentence contains a sequence of words w1, w2, w3 which at the step of part-of-speech tagging obtained HVZ, BEN, VBN tags respectively, then the word with VBN tag in this sequence is in Action." For example, has _HVZ been_BEN produced_VBN=> (A=produce). Furthermore, the voice of the action (active or passive voice) is taken into consideration in the rules for extraction of Subject and Object.

Recognition of Whole-Part relations within and/or between the eSAOs is performed by the Whole-Part (W-P) Recognizer 320, which then produces the semantically analyzed text 16. An embodiment of this procedure is described below in more detail, according aspects of the present invention.

The Whole-Part recognizer 320 uses algorithms for detecting Whole-Part relations in text sentences within a single eSAO as well as between different eSAOs. These algorithms can be categorized as generating linguistic models or patterns. Firstly, the patterns describe the use environment, i.e. indicators of presence of Whole-Part relations in a sentence, and secondly, the information about which components of a single eSAO act as the Whole element of the relation and which components of a single eSAO or set of eSAOs act as the Part element of the relation. Whole-Part indicators refer to separate eSAO components and describe linguistic units, their lexical and grammatical tags, semantic classes etc.

The Whole-Part Recognizer 320 preferably analyzes all eSAOs, and sets of eSAOs for compliance with one of the patterns from a common list. If an eSAO or set of eSAOs complies with a pattern, the Whole-Part recognizer 320 registers the presence of Whole-Part a relation and marks which components of the eSAO or set of eSAOs are semantic units of the Whole type and which semantic units are of the Part type, in accordance with the pattern. The eSAOs and sets of eSAOs marked this way are then directed to the Knowledge Base Generator 40 (see FIG. 1), which forms a list of objects/concepts and a list of facts having a Whole-Part relation between them, and stores the lists in the Whole-Part Knowledge Base 50.

Presented below are the preferred patterns for recognition of Whole-Part relations in text, in accordance with this embodiment. However, other patterns may also be used in accordance with other embodiments.

Part I. Patterns for Recognition of Whole-Part Relations in a Single eSAO.

Pattern 1: "Subject/Object+Action" Type

This pattern arises if an eSAO is recognized in the text and the eSAO has at least three non-empty fields for Subject, Action and Object. Two cases are possible for this pattern, in this embodiment. In the first case, Subject has a "PART-OF" sense, the Object is not empty and the Action linking the Subject to the Object is of LINK-VERB sense. In the second case, the Action has the same sense, the Subject is not empty and the Object has "PART-OF" sense. In any case, the certain part of the eSAO component (Subject or Object) that has "PART-OF" sense, is recognized as the Whole component of the output relation and the other component of the indicated pair of components is recognized as the Part.

In this pattern, the "PART-OF" Subject/Object sense is a non-terminal symbol denoting any word or phrase not having the word "of" therein and ending with a word or phrase matching at least one word of the following list: "part|component|constituent|element|unit|construct|ingredient|interior|inside," followed by the word "of" and further followed by any word or phrase. The part of the Subject/Object following the word "of" is recognized as the "Whole" part of the output relation. In a preferred embodiment, the "LINK-VERB" sense at least matches the words or phrases "be|present|represent." Table 4 shows the generic form of Pattern 1 for the first case.

TABLE 4

| Subject | PART-OF | Whole |
|---|---|---|
| Action | LINK-VERB | |
| Object | not empty | Part |
| Preposition | — | |
| Indirect Object | — | |
| Adjective | — | |
| Adverbial | — | |

As example, consider the input sentence to be "The principal part of the car is the driver's wheel." Table 5 shows the eSAO extracted from the sentence:

TABLE 5

| Subject | principal part of the car |
|---|---|
| Action | be |
| Object | driver's wheel |
| Preposition | — |
| Indirect Object | — |
| Adjective | — |
| Adverbial | — |

Because this eSAO meets the conditions of the Pattern 1, the following Whole-Part relation is obtained:

Whole=car

Part=driver's wheel

Table 6 shows the generic form of Pattern 1 for the second case.

TABLE 6

| Subject | not empty | Part |
|---|---|---|
| Action | LINK-VERB | |
| Object | PART-OF | Whole |
| Preposition | — | |
| Indirect Object | — | |
| Adjective | — | |
| Adverbial | — | |

For example, the input sentence "The driver's wheel represents the principal part of the car" would result in the eSAO shown in Table 7.

TABLE 7

| Subject | driver's wheel |
|---|---|
| Action | represent |
| Object | principal part of the car |
| Preposition | — |
| Indirect Object | — |
| Adjective | — |
| Adverbial | — |

The Whole-Part relation resulting from this input sentence according to a preferred embodiment is:

Whole=car

Part=driver's wheel

Pattern 2: "Action" Type

Pattern 2 arises if the Action field has a "COMPRISE" sense or is expressed by verbs "have" or "include." In this pattern a "COMPRISE" Action sense is a non-terminal symbol denoting at least the words or phrases "comprise|contain|incorporate|consist of." Table 8 shows the generic form of Pattern 2.

TABLE 8

| Subject | not empty | Whole |
|---|---|---|
| Action | COMPRISE \| have \| include | |
| Object | not empty | Part |
| Preposition | — | |
| Indirect Object | — | |
| Adjective | — | |
| Adverbial | — | |

In case Action is expressed by the verb "have," it must be presented by the "having" form in the original sentence. Action expressed by the verb "include" and presented by the "including" form in the original sentence must have the related eSAO with Subject in singular number.

For example, the input sentences "The internal combustion engine 15*b* contains the camshaft 17*a*," "The internal combustion engine 15*b* having the camshaft 17*a*," "The internal combustion engine 15b includes the camshaft 17a," "The internal combustion engine 15b including the camshaft 17a" would each result in the corresponding eSAOs shown in Table 9.

TABLE 9

| Subject | internal combustion engine 15b |
|---|---|
| Action | contain \| have \| include \| include |
| Object | camshaft 17a |
| Preposition | — |
| Indirect Object | — |
| Adjective | — |
| Adverbial | — |

Because all these eSAO meet the conditions of the Pattern 2, the following Whole-Part relation is obtained:

Whole=internal combustion engine 15b

Part=camshaft 17a

Pattern 3: "Action+Preposition" Type

There are two types of such a pattern. In first case, the pattern arises if the Action field has an "EQUIP" sense and Preposition field has a "WITH" sense. In this case, the "EQUIP" Action sense is a non-terminal symbol denoting at least the words or phrases "equip|provide|supply|instrument." The "WITH" Preposition sense is a non-terminal symbol denoting at least the word "with." Table 10 shows the generic form of Pattern 3 for this case.

TABLE 10

| Subject | — | |
|---|---|---|
| Action | EQUIP | |
| Object | not empty | Whole |
| Preposition | WITH | |
| Indirect Object | not empty | Part |
| Adjective | — | |
| Adverbial | — | |

For example, the input sentence of "The car is equipped with the engine" would result in the eSAO shown in Table 11.

TABLE 11

| Subject | — |
|---|---|
| Action | equip |
| Object | car |
| Preposition | with |
| Indirect Object | engine |
| Adjective | — |
| Adverbial | — |

The Whole-Part relation resulting from this input sentence according to a preferred embodiment is:

Whole=car

Part=engine

In the second case, Pattern 3 arises if the Action field has a "POSITION" sense and is expressed in the original sentence by a verb in passive mode, and the Preposition field has an "INSIDE" sense. In this pattern, the "POSITION" Action sense is a non-terminal symbol at least matching words or phrases "equip|provide|supply|instrument." The "INSIDE" Preposition sense is a non-terminal symbol that at least matches words or phrases "inside | within." Table 12 shows the generic form of Pattern 3 for this case.

TABLE 12

| Subject | — | |
|---|---|---|
| Action | POSITION | |
| Object | not empty | Part |
| Preposition | INSIDE | |
| Indirect Object | not empty | Whole |
| Adjective | — | |
| Adverbial | — | |

For example, the input sentence of "The engine is located inside the card" would result in the eSAO shown in Table 13.

TABLE 13

| Subject | — |
|---|---|
| Action | locate |
| Object | engine |
| Preposition | inside |
| Indirect Object | car |
| Adjective | — |
| Adverbial | — |

The Whole-Part relation resulting from this input sentence according to a preferred embodiment is:

Whole=car

Part=engine

Pattern 4: "NounPhrase" Type

Pattern 4 arises if a NounPhrase denoting Subject component or Object component of an eSAO contains the following structure:

NG1–CONTAINING|RICH NG2

In this pattern, NG1 and NG2 are non-terminal symbols denoting noun groups; "CONTAINING" is a non-terminal symbol that at least matches the words "containing|comprising|incorporating;" "RICH" is a non-terminal symbol denoting at least the words "rich|based|laden|enriched|reduced|fortified." In this case, NG2 is recognized as the Whole component of the Whole-Part relation and NG1 is recognized as the Part component.

For example, the input sentences (the example contains only sentence parts necessary for pattern illustration) "Gold-containing cord is . . . " and "Oxygen-rich water is . . . " meet the conditions of pattern 4 and the following Whole-Part relations are correspondingly obtained:

| Whole = cord | Whole = water |
|---|---|
| Part = gold | Part = oxygen |

Part II. Patterns for Recognition of Whole-Part Relations from a Set of eSAOs

Pattern 5: "Gerund phrase" Type

Pattern 5 is aimed at extraction of Whole-Part relations between eSAOs, where one eSAO denotes the Whole component of relation and the other eSAOs denote Part components. Pattern 5 arises if an eSAO with Action field expressed in the original sentence by gerund (VBG) phrase is followed by an eSAO where Action field has a "COMPRISE" sense, and is further followed by one or more eSAOs expressed by gerund phrases separated by ";" or "," or other punctuation marks or conjunctions. The first eSAO is marked as the Whole eSAO and the other eSAOs starting from the third eSAO are marked as the Part eSAOs. Between at least three eSAOs mentioned above, there may be other so called attributive eSAOs that may be marked as eSAO-attributes, if necessary. In this pattern, the "COMPRISE" Action sense is a non-terminal symbol at least matching words or phrases "comprise|include|contain|incorporate|consist of" Table 14 shows the generic form of Pattern 5, not including attributive eSAOs.

TABLE 14

|  | eSAO-1 | eSAO-2 | {eSAO-i}, i ≥ 3 |
|---|---|---|---|
| Subject | — | — | — |
| Action | VBG (-ing form) | COMPRISE | VBG (-ing form) |
| Object | — | — | — |
| Preposition | — | — | — |
| Indirect Object | — | — | — |
| Adjective | — | — | — |
| Adverbial | — | — | — |

For example, the set of eSAOs extracted from the input sentence of "Creating a data flow includes the following steps: adding one or more sources to extract data from files and databases; adding the transformations that meet the business requirements" is shown in Table 15.

TABLE 15

|  | eSAO-1 | eSAO-2 | eSAO-3 | eSAO-4 | eSAO-5 | eSAO-6 |
|---|---|---|---|---|---|---|
| Subject | — | — | — | — | — | — |
| Action | create | include | add | extract | add | meet |
| Object | data flow | following steps | one or more sources | data | transformations | business requirements |
| Preposition | — | — | — | from | — | — |
| Indirect Object | — | — | — | files and database | — | — |
| Adjective | — | — | — | — | — | — |
| Adverbial | — | — | — | — | — | — |

Because all these eSAOs meet the conditions of Pattern 5, the following Whole-Part relation is obtained:
Whole=eSAO-1
Part={eSAO-3/attr. eSAO-4, eSAO-5/attr. eSAO-6}
Pattern 6: "IF clause" Type
Pattern 6 arises if an eSAO with an Action field expressed in the original sentence by clause of condition (IF-clause) introduced by conjunctions where at least "if | when" is followed by an eSAO that has an Action field with a "PERFORM" sense, and is further followed by one or more eSAOs separated by ";" or "," or other punctuation marks or conjunctions. The first eSAO is marked as the Whole eSAO and the other eSAOs starting from the third eSAO are marked as the Part eSAOs. In this pattern, the "PERFORM" Action sense is a non-terminal symbol at least matching words or phrases "follow|complete|do|perform|take." Table 16 shows the generic form of Pattern 6.

TABLE 16

|  | eSAO-1 | eSAO-2 | {eSAO-i}, i ≥ 3 |
|---|---|---|---|
| Subject | — | — | — |
| Action | IF-clause | PERFORM | not empty |
| Object | — | — | — |
| Preposition | — | — | — |
| Indirect Object | — | — | — |
| Adjective | — | — | — |
| Adverbial | — | — | — |

For example, the set of eSAOs extracted from the input sentence of "When initially creating an extension, take the following steps: coordinate the use of extension with the vendor; write an extension specification" is shown in Table 17.

TABLE 17

|  | eSAO-1 | eSAO-2 | eSAO-3 | eSAO-4 |
|---|---|---|---|---|
| Subject | — | — | — | — |
| Action | create | take | coordinate | write |
| Object | extension | following steps | use of extension | extension specification |
| Preposition | — | — | with | — |
| Indirect Object | — | — | vendor | — |
| Adjective | — | — | — | — |
| Adverbial | initially | — | — | — |

Because all these eSAOs meet the conditions of Pattern 6, the following Whole-Part relation is obtained:
Whole=eSAO-1
Part={eSAO-3, eSAO-4}
Pattern 7: "Infinitive phrase" Type
Pattern 7 arises if an eSAO with an Action field expressed in the original sentence by an infinitive phrase introduced by particle "to" or at least phrase "in order to" is followed by an eSAO where Action field has a "PERFORM" sense, and is further followed by one or more eSAOs separated by ";" or "," or other punctuation marks or conjunctions. The first eSAO is marked as the Whole eSAO and the other eSAOs starting from the third eSAO are marked as the Part eSAOs. In this pattern, the "PERFORM" Action sense is a non-terminal symbol at least matching words or phrases "follow|complete|do|perform|take." Table 18 shows the generic form of Pattern 7.

TABLE 18

|  | eSAO-1 | eSAO-2 | {eSAO-i}, i ≥ 3 |
|---|---|---|---|
| Subject | — | — | — |
| Action | Infinitive phrase (TO VB) | PERFORM | not empty |
| Object | — | — | — |
| Preposition | — | — | — |
| Indirect Object | — | — | — |
| Adjective | — | — | — |
| Adverbial | — | — | — |

For example, the set of eSAOs extracted from the input sentence of "To change your margins in Microsoft Internet Explorer follow these steps: Click on the File menu; Select Page Setup" is shown in Table 19.

TABLE 19

|  | eSAO-1 | eSAO-2 | eSAO-3 | eSAO-4 |
|---|---|---|---|---|
| Subject | — | — | — | — |
| Action | change | follow | click | select |
| Object | your margins | steps | — | Page Setup |

TABLE 19-continued

| | eSAO-1 | eSAO-2 | eSAO-3 | eSAO-4 |
|---|---|---|---|---|
| Preposition | — | — | on | — |
| Indirect Object | — | — | File menu | — |
| Adjective | in | — | — | — |
| Adverbial | Microsoft Internet Explorer | — | — | — |

Because all these eSAOs meet the conditions of Pattern 7, the following Whole-Part relation is obtained:

Whole=eSAO-1
Part={eSAO-3, eSAO-4}

Figure 4:
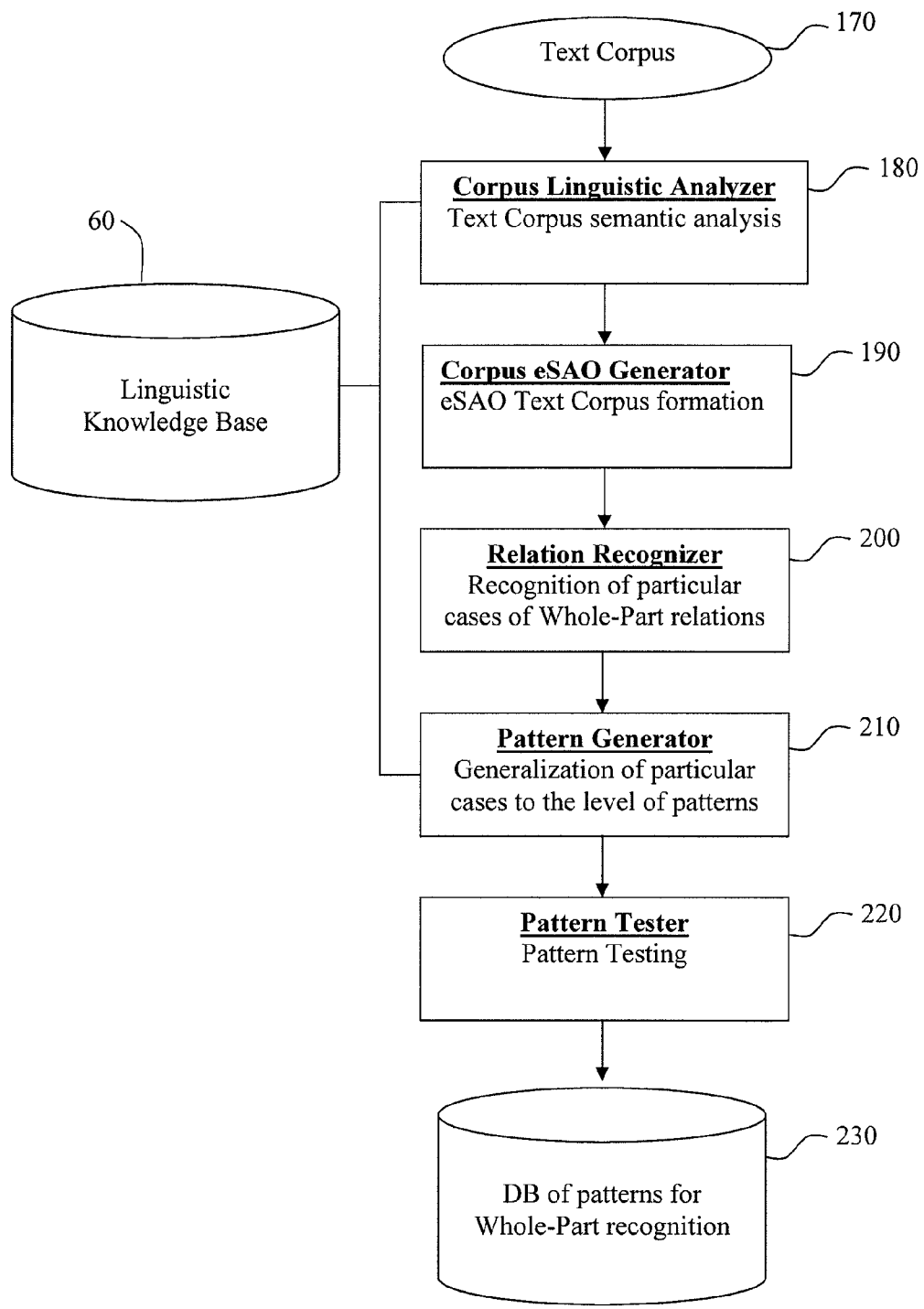
FIG. 4 is an embodiment of a principal scheme of building the Data Base of Whole-Part patterns according to aspects of the present invention.

FIG. 4 shows the modules that can be used to generate relationship models that may be used in the embodiments disclosed herein. As shown in FIG. 4, a sufficiently large corpus of text documents 170 are preferably used to establish and form the models or patterns. The Corpus Linguistic Analyzer 180 performs a linguistic analysis on the corpus 170 to recognize eSAOs. The Corpus ESAO Generator 190 generates a corpus of sentences containing at least one eSAO (complete or incomplete). The Relation Recognizer 200 performs the process of recognition of some particular cases of Whole-Part relations in the sentences containing at least one eSAO. The Pattern Generator 210 generalizes particular cases to more general patterns. The Pattern Tester 220 checks for the presence of Whole-Part relations and places approved patterns into the database 230 for Whole-Part relation recognition.

Preferably, the function of the Relation Recognizer 200 is carried out manually by experts. For example, an expert analyzes the sentence "The engine is located inside the car" from eSAO Text Corpus, where the Linguistic Analyzer performed part-of-speech tagging, parsing and semantic analysis and recognized an eSAO (see Table 13), and puts special tags that indicate that Object and IndirectObject of this eSAO form a Whole-Part relation, where IndirectObject is the Whole component of the relation and Object is the Part component. Such distribution of roles is possible based on the sense of the preposition "inside." Then this sentence goes to the Pattern Generator 210.

The Pattern Generator 210 performs analysis and generalization of the Whole-Part relations to the level of patterns. The function of the Pattern Generator is also preferably carried out manually by experts. In this way, an expert takes into consideration his or her own experience and knowledge as well as the knowledge contained in Linguistic Knowledge Base. Returning to the previous example, the expert should come to a conclusion that preposition "within" has meaning similar to the preposition "inside," and at least verbs "situate|contain|position|dispose|fix|install|mount|house" have meaning similar to that of the verb "locate." Therefore, the expert registers the prototype of the pattern in the way represented in Table 12.

The Pattern Tester 220, using prototypical patterns, looks for the examples of Whole-Part relations in eSAO Text Corpus. The expert analyzes the retrieved examples and approves the pattern (possibly with some corrections). The Pattern Tester 220 then puts this approved pattern into the Data Base 230 of patterns for Whole-Part recognition.

As indicated above, both the Semantic Analyzer 180 and the Pattern Generator 210 may access the Linguistic Knowledge Base for the performance of their functions. Further, in some embodiments, the Data Base 230 of patterns may be incorporated within the Linguistic Knowledge Base 60 to support the Whole-Part semantic processing described above with respect to FIGS. 1-3.

Embodiments in accordance with aspects of the present invention can be provided by computer-executable instructions resident on one or more computers, microprocessors, microcontrollers, or other processing devices. The computer-executable instructions for executing the system and method can be resident in memory in the processing devices or may be provided to the processing devices by floppy disks, hard disks, compact disk (CDs), digital versatile disks (DVDs), read only memory (ROM), or any other storage medium.

The foregoing Detailed Description of exemplary and preferred embodiments is presented for purposes of illustration. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art, having understood the disclosure herein. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

This disclosure has been made with respect to the current state of the art, but also contemplates advancements and that adaptations in the future may take into consideration those advancements, namely in accordance with the then current state of the art. It is intended that the scope of the invention be defined by the Claims as written and equivalents as applicable. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

What is claimed is:

1. A processor-implemented method for automatically recognizing Whole-Part relations in a natural language document, the method comprising:

providing a database having a plurality of stored generic Whole-Part relationship patterns as models for determining Whole-Part relations of the outside world in external natural language documents, wherein each generic Whole-Part relationship pattern identifies:
a sense of one or more components of an expanded Subject-Action-Object (eSAO) and whether or not other components of the eSAO are non-empty; and
which components of the eSAO act as a Whole eSAO and which components act as a Part eSAO in a Whole-Part relation;

providing text from the natural language document;

recognizing one or more eSAO sets in the text, wherein each eSAO set has one or more eSAO components;

matching the one or more eSAO sets against the generic Whole-Part relationship patterns stored in the database, including determining if the eSAO component sense and non-empty requirements of a generic Whole-Part relationship pattern are satisfied by an eSAO set and, if the eSAO component sense and non-empty requirements of a generic Whole-Part relationship pattern are satisfied by an eSAO set, determining which eSAO component of the eSAO set is a Whole eSAO and which is a Part eSAO; and generating one or more eSAO Whole-Part relations based on the matching, wherein the eSAO Whole-Part relation comprises a Whole eSAO and an Part eSAO.

2. The method according to claim 1, wherein the one or more eSAO components are one or more elements from a group comprising:
subjects, objects, actions, adjectives, prepositions, indirect objects, and adverbs.

3. The method according to claim 1, wherein:
the Whole eSAO comprises one or more of the eSAO components or a part of a single eSAO component of the one or more eSAO sets; and
the Part eSAO comprises one or more of the eSAO components or a part of a single eSAO component of the one or more eSAO sets.

4. The method according to claim 2, wherein the eSAO Whole-Part relations comprise a sequential operator relating the eSAO components of the Whole eSAO to the eSAO components of the Part eSAO, the operator including one or more of a lexical, grammatical, and semantic language indicator.

5. The method according to claim 1, further comprising:
applying parts-of-speech tags to at least portions of the text to generate tagged portions of the text; and
parsing the tagged portions of the text to generate parsed and tagged portions of the text, wherein recognizing the eSAO sets in the text is performed on the parsed and tagged portions of the text.

6. The method according to claim 5, wherein applying parts-of-speech tags is performed on preformatted portions of the text, whereby the preformatted portions of the text comprise the text with non-natural language symbols removed.

7. The method according to claim 1, wherein:
matching the one or more eSAO sets against generic Whole-Part relationship patterns comprises matching a single eSAO set; and
generating one or more eSAO Whole-Part relations based on the matching comprises generating a single eSAO Whole-Part relation.

8. The method according to claim 1, wherein:
matching the one or more eSAO sets against generic Whole-Part relationship patterns comprises matching a pair of eSAO sets; and
generating one or more eSAO Whole-Part relations based on the matching comprises generating a single eSAO Whole-Part relation based on matching the pair of eSAO sets.

9. The method according to claim 1, wherein matching the one or more eSAO sets against generic Whole-Part relationship patterns comprises accessing a generic Whole-Part pattern database that is generated by a method comprising:
recognizing eSAO sets in a corpus of text documents that does not include the natural language document;
generating a corpus of sentences, wherein each sentence contains at least one of the recognized eSAO sets;
recognizing particular cases of Whole-Part relations in the sentences;
generalizing the particular cases of Whole-Part relations into eSAO Whole-Part patterns; and
storing the eSAO Whole-Part patterns in the Whole-Part pattern database.

10. The method according to claim 1, wherein recognizing one or more expanded Subject-Action-Object (eSAO) sets in the text comprises accessing a linguistic knowledge base having a database defining eSAO components.

11. The method according to claim 1, wherein recognizing one or more expanded Subject-Action-Object (eSAO) sets in the text comprises recognizing one or more of subjects, objects, actions, adjectives, prepositions, indirect objects, and adverbs in one or more sentences of the text.

12. A computer-based method for generating a Whole-Part knowledge base by automatically recognizing Whole-Part relations in natural language documents, the method comprising:
providing a database having a plurality of stored generic Whole-Part relationship patterns as models for determining Whole-Part relations of the outside world in external natural language documents, wherein each generic Whole-Part relationship pattern identifies:
a sense of one or more components of an expanded Subject-Action-Object (eSAO) and whether or not at least two other components of the eSAO are non-empty; and
which components of the eSAO act as a Whole eSAO and which components act as a Part eSAO in a Whole-Part relation;
providing text from at least one natural language document;
recognizing one or more eSAO sets in the text, wherein each eSAO set has one or more eSAO components;
matching the one or more eSAO sets against generic Whole-Part relationship patterns comprising Whole-Part indicators, including determining if the eSAO component sense and non-empty requirements of a generic Whole-Part relationship pattern are satisfied by an eSAO set and, if the eSAO component sense and non-empty requirements of a generic Whole-Part relationship pattern are satisfied by an eSAO set, determining which eSAO component is a Whole eSAO and which is a Part eSAO;
generating one or more eSAO Whole-Part relations based on the matching, wherein the eSAO Whole-Part relation comprises a Whole eSAO and an Part eSAO; and
storing the one or more eSAO Whole-Part relations in the Whole-Part knowledge base.

13. A computer program product comprising a computer-readable medium having computer-executable instructions for performing a method for recognizing Whole-Part relations in natural language documents, the method comprising:
accessing a database having a plurality of stored generic Whole-Part relationship patterns as models for determining Whole-Part relations of the outside world in external natural language documents, wherein each generic Whole-Part relationship pattern identifies:
a sense of one or more components of an expanded Subject-Action-Object (eSAO) and whether or not other components of the eSAO are non-empty; and
which components of the eSAO act as a Whole eSAO and which components act as a Part eSAO in a Whole-Part relation;
providing text from at least one natural language document;
recognizing one or more eSAO sets in the text, wherein each eSAO set has one or more eSAO components;
matching the one or more eSAO sets against generic Whole-Part relationship patterns comprising whole-part indicators, including determining if the eSAO component sense and non-empty requirements of a generic Whole-Part relationship pattern are satisfied by an eSAO set and, if the eSAO component sense and non-empty requirements of a generic Whole-Part relationship pattern are satisfied by an eSAO set, determining which eSAO component of the eSAO set is a Whole eSAO and which is a Part eSAO;

generating one or more eSAO Whole-Part relations based on the matching, wherein the eSAO Whole-Part relation comprises a Whole eSAO and an Part eSAO.

14. The computer program product of claim 13, wherein the method further comprises storing the one or more eSAO Whole-Part relations in a Whole-Part knowledge base.

15. A semantic processor for automatically recognizing Whole-Part relations in text in electronic or digital form, the semantic processor comprising:

a linguistic knowledge base having a plurality of stored generic Whole-Part relationship patterns as models for determining Whole-Part relations of the outside world in external natural language documents, wherein each generic Whole-Part relationship pattern identifies:

a sense of one or more components of an expanded Subject-Action-Object (eSAO) and whether or not other components of the eSAO are non-empty; and which components of the eSAO act as a Whole eSAO and which components act as a Part eSAO in a Whole-Part relation; and a semantic analyzer comprising:

an expanded subject-action-object (eSAO) recognizer for producing one or more eSAO sets based on the text, wherein the eSAO sets are based on eSAO definitions stored in the linguistic knowledge base; and a Whole-Part recognizer configured to match the one or more eSAO sets with known generic Whole-Part relationship patterns comprising Whole-Part indicators stored in the linguistic knowledge base, including determining if the eSAO component sense and non-empty requirements of a generic Whole-Part relationship pattern are satisfied by an eSAO set and, if the eSAO component sense and non-empty requirements of a generic Whole-Part relationship pattern are satisfied by an eSAO set, determining which eSAO component of the eSAO set is a Whole eSAO and which is a Part eSAO and to produce one or more eSAO Whole-Part relations based on the match.

16. The semantic processor of claim 15, wherein the semantic processor comprises a linguistic analyzer comprising the semantic analyzer, the linguistic analyzer further comprising:

a part-of-speech tagger configured to apply parts of speech tags to at least portions of the text; and a parser configured to parse the text tagged by the parts-of-speech tagger and to provide the parsed and tagged text to the expanded subject-action-object (eSAO) recognizer.

17. The semantic processor of claim 16, further comprising:

a preformatter configured to receive the text in electronic or digital format and to produce preformatted text based on data stored in the linguistic knowledge base, for input to the part-of-speech tagger; and a knowledge base generator configured to produce a Whole-Part knowledge base from the one or more eSAO Whole-Part relations generated by the linguistic analyzer.

18. The semantic processor of claim 17, wherein the preformatter is configured to perform at least one of the following functions:

remove symbols in a digital or electronic representation of the text that do not form a part of natural language text;

detect and correct mismatches or mistakes in the text; and partition the text into structures of sentences and words.

19. The semantic processor of claim 15, further comprising a Whole-Part relationship generator configured to generate and store the generic Whole-Part relationship patterns, the Whole-Part relationship generator comprising:

a corpus linguistic analyzer configured to recognize eSAO sets in a corpus of text documents;

a corpus eSAO generator configured to generate a corpus of sentences, wherein each sentence contains at least one of the recognized eSAO sets;

a relation recognizer configured to recognize particular cases of Whole-Part relations in the sentences;

a pattern generator configured to generalize the particular cases of Whole-Part relations to eSAO Whole-Part patterns; and a pattern tester configured to store the eSAO Whole-Part patterns in a Whole-Part pattern database.

20. The semantic processor of claim 15, wherein the one or more eSAO Whole-Part relations each comprises a Whole eSAO, a Part eSAO, and at least one sequential operator relating the Whole eSAO to the Part eSAO.

21. The semantic processor of claim 20, wherein each eSAO set based on the text comprises eSAO components and the Whole eSAO comprises one or more of the eSAO components and the Part eSAO comprises one or more of the eSAO components different than the one or more eSAO components of the Whole eSAO.

22. The semantic processor according to claim 21, wherein the eSAO components are one or more elements from a group comprising:

subjects, objects, actions, adjectives, prepositions, indirect objects, and adverbs.

23. The semantic processor according to claim 15, wherein the Whole-Part recognizer is further configured to match a single eSAO set with a generic Whole-Part relationship pattern to generate a single eSAO Whole-Part relation.

24. The semantic processor according to claim 15, wherein the Whole-Part recognizer is further configured to match a pair of eSAO sets with a generic Whole-Part relationship pattern to generate a single eSAO Whole-Part relation.

* * * * *